(12) United States Patent
Kim et al.

(10) Patent No.: US 11,563,890 B2
(45) Date of Patent: Jan. 24, 2023

(54) PHOTOGRAPHING SYSTEM AND PHOTOGRAPHING SYSTEM CONTROL METHOD

(71) Applicant: Mirae Autos Co., Ltd., Seoul (KR)

(72) Inventors: Sung Ju Kim, Suwon-si (KR); Sang Ryang Kim, Asan-si (KR); Dong Hyuck Kyung, Anyang-si (KR); Sang Ho Park, Yongin-si (KR)

(73) Assignee: MIRAE AUTOS CO., LTD., Seoul (KR)

( * ) Notice: Subject to any disclaimer, the term of this patent is extended or adjusted under 35 U.S.C. 154(b) by 0 days.

(21) Appl. No.: 17/292,919

(22) PCT Filed: Nov. 14, 2018

(86) PCT No.: PCT/KR2018/013873
§ 371 (c)(1),
(2) Date: May 11, 2021

(87) PCT Pub. No.: WO2020/101057
PCT Pub. Date: May 22, 2020

(65) Prior Publication Data
US 2021/0409595 A1   Dec. 30, 2021

(30) Foreign Application Priority Data

Nov. 13, 2018 (KR) .................. 10-2018-0139469

(51) Int. Cl.
*H04N 5/232* (2006.01)
*G06T 7/20* (2017.01)
*H04N 5/262* (2006.01)

(52) U.S. Cl.
CPC .......... *H04N 5/23229* (2013.01); *G06T 7/20* (2013.01); *H04N 5/23216* (2013.01); *H04N 5/2628* (2013.01); *G06T 2207/20104* (2013.01)

(58) Field of Classification Search
CPC .......... H04N 5/23229; H04N 5/23216; H04N 5/2628; H04N 5/3454; H04N 5/341;
(Continued)

(56) References Cited

U.S. PATENT DOCUMENTS

| 2013/0208159 A1* | 8/2013 | Sambonsugi | .......... H04N 5/345 348/302 |
| 2014/0300765 A1* | 10/2014 | Takao | ................ H04N 5/23254 348/208.1 |
| 2016/0134845 A1* | 5/2016 | Asai | ....................... H04N 7/181 348/234 |

FOREIGN PATENT DOCUMENTS

| CN | 1852398 | 10/2006 |
| JP | 2016090786 | 5/2016 |

(Continued)

OTHER PUBLICATIONS

International Search Report—PCT/KR2018/013873 dated Aug. 8, 2019.
(Continued)

*Primary Examiner* — Lin Ye
*Assistant Examiner* — Tuan H Le
(74) *Attorney, Agent, or Firm* — Cantor Colburn LLP (57) ABSTRACT

Provided is an image sensor including a pixel array formed by arranging pixels, which generate an electrical signal in response to light; a memory for storing a register value of the image sensor; and a sensor controller for configuring the register value, wherein the register value includes information for defining a region to be processed in the pixel array, and when a change request for changing at least one of a position and a size of the region to be processed is received, the sensor controller provides a register modification command for adjusting the register value so as to correspond to the change request to the image sensor or the memory.

6 Claims, 6 Drawing Sheets

(58) Field of Classification Search
CPC ...... H04N 5/357; H04N 5/3572; H04N 5/372; H04N 5/2254; H04N 5/3741; G06T 7/20; G06T 2207/20104
See application file for complete search history.

(56) References Cited

FOREIGN PATENT DOCUMENTS

| | | |
|---|---|---|
| JP | 2017162141 | 9/2017 |
| JP | 2017224974 | 12/2017 |
| KR | 19980079970 | 11/1998 |
| KR | 100505802 | 8/2005 |
| KR | 20070112949 | 11/2007 |
| KR | 20090118857 | 11/2009 |
| KR | 20140019575 | 2/2014 |
| KR | 20170011817 | 2/2017 |

OTHER PUBLICATIONS

Chinese Office Action—Chinese Application No. 201910922396.8 dated Feb. 9, 2021.
Japanese Office Action—Japanese Application No. 2021-525166 dated May 31, 2022.
Korean Office Action—Korean Application No. 10-2018-0139469 dated Dec. 23, 2019.

\* cited by examiner

PHOTOGRAPHING SYSTEM AND PHOTOGRAPHING SYSTEM CONTROL METHOD

TECHNICAL FIELD

The present invention relates to a photographing system.

BACKGROUND ART

In order to prevent vignetting, such as darkening or blackening of edges or outer parts of an image due to a decrease in amount of light in a surrounding region upon photographing, an image sensor has been often produced by arranging more pixels than an output resolution.

In this case, a lot of pixels that are idle without use occurred, which was causing unnecessary waste of resources.

Accordingly, the inventors of the present invention have conceived the present invention in a process of finding a method of using the pixels that are idle.

DISCLOSURE

Technical Problem

An aspect of the present invention may provide a photographing system capable of improving resource utilization efficiency.

Another aspect of the present invention may provide a photographing system control method capable of improving resource utilization efficiency.

Technical Solution

According to an embodiment of the present invention, there is provided a photographing system including: an image sensor comprising a pixel array formed by arranging pixels, which generate an electrical signal in response to light; a memory for storing a register value of the image sensor; and a sensor controller for configuring the register value, wherein the register value includes information for defining a region to be processed in the pixel array, and when a change request for changing at least one of a position and a size of the region to be processed is received, the sensor controller provides a register modification command for adjusting the register value so as to correspond to the change request to the image sensor or the memory.

The photographing system may further include a control unit which generates the change request by receiving a user's input by a user interface unit.

At this time, the photographing system may further include a control unit which generates the change request when a result of analyzing at least one of photographed image data, photographed picture data, and sensing data of an approximate sensor corresponds to a predetermined condition.

The position of the region to be processed may be defined by at least one of a start value which is a planar coordinate value of one lower end of the region to be processed, an end value which is a planar coordinate value of the other upper end of the region to be processed, and a middle value which is a planar coordinate value of a central point of the region to be processed.

The size of the region to be processed may be defined by two values selected from the start value which is the planar coordinate value of one lower end of the region to be processed, the end value which is the planar coordinate value of the other upper end of the region to be processed, and the middle value which is the planar coordinate value of a central point of the region to be processed.

The photographing system may further include an image signal processing unit for processing an image signal output from the image sensor, wherein the image signal processing unit may receive the change request from the control unit.

When the register modification command is provided in the memory, the register value may be loaded to the image sensor when the image sensor is turned on or reset while the register value is stored in the memory.

According to another embodiment of the present invention, there is provided a photographing system control method including the steps of: inputting a change request for changing at least one of a position and a size of a region to be processed; applying a register modification command for adjusting a register value so as to correspond to the change request to the image sensor or the memory; changing the register value of the image sensor by the register modification command; outputting an image signal from the image sensor while at least one of the position and the size of the region to be processed is changed; and processing and then displaying or storing the image signal output from the image sensor.

The photographing system control method may further include analyzing at least one or more of photographed image data, photographed picture data, and sensing data of an approximate sensor; and generating the change request when the analysis result corresponds to a predetermined condition.

Further, the photographing system control method may further include determining an interest object from the photographed image data; and generating a change request for changing the position of the region to be processed according to a moving direction of the interest object.

Advantageous Effects

According to an embodiment of the present invention, the photographing system provides a useful effect capable of improving resource utilization efficiency.

BEST MODE FOR THE INVENTION

Figure 1:
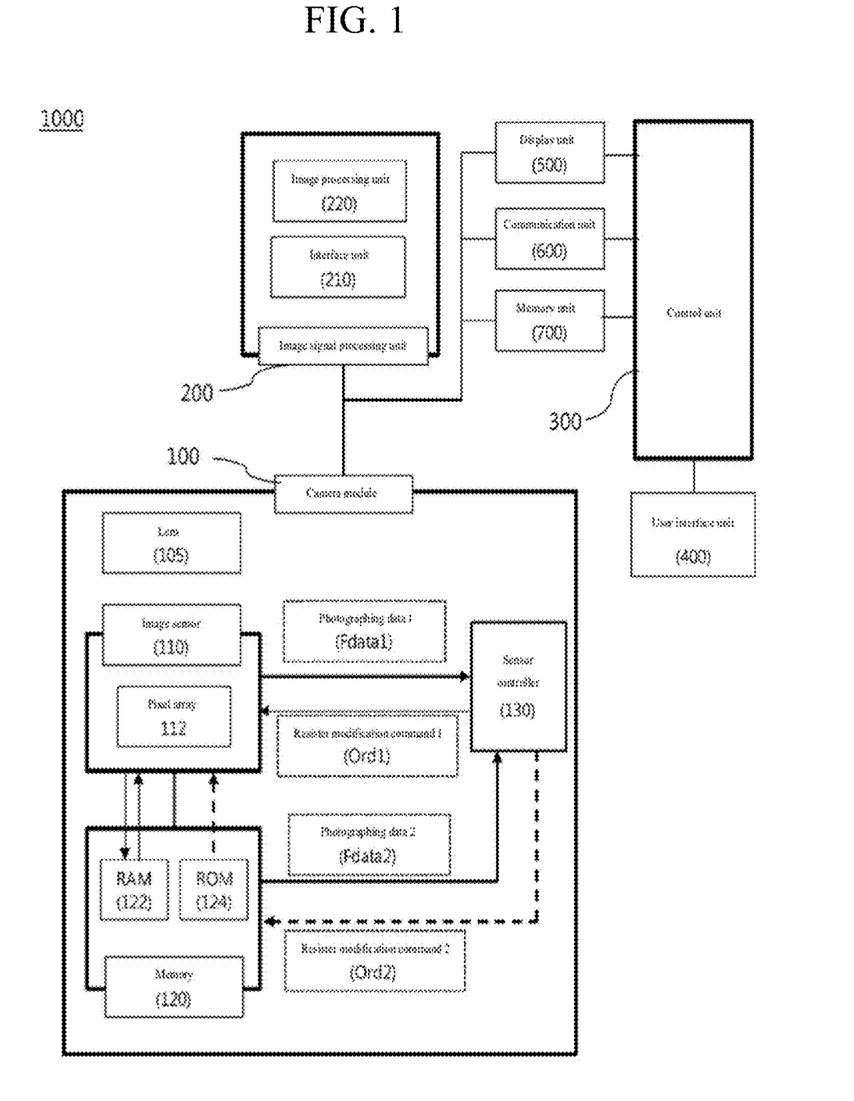
FIG. 1 is a block diagram schematically illustrating a photographing system according to an embodiment of the present invention.
Figure 2:
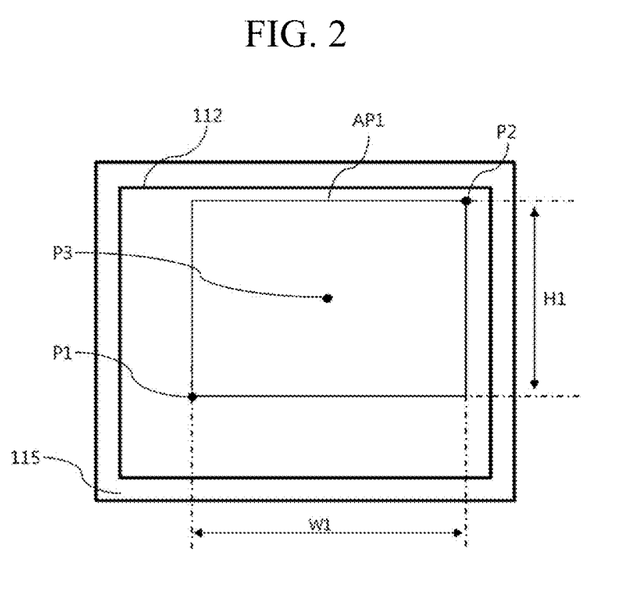
FIG. 2 is a schematic diagram for describing a region to be processed of the photographing system according to an embodiment of the present invention.
Figure 3:
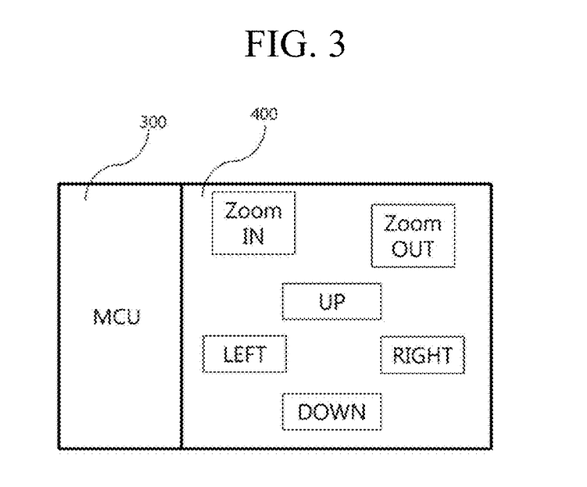
FIG. 3 is a diagram schematically illustrating a user interface unit of the photographing system according to an embodiment of the present invention.
Figure 4:
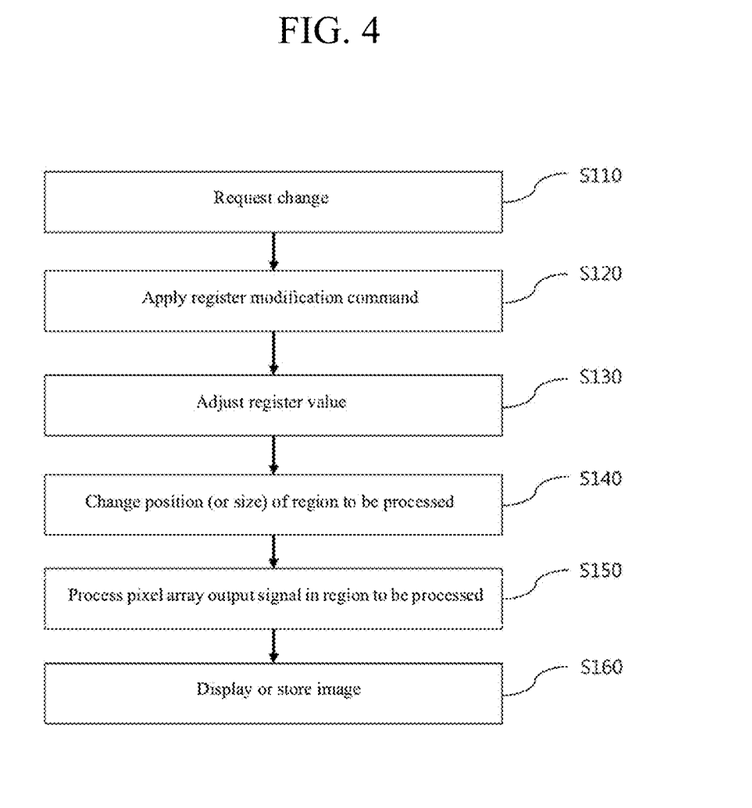
FIG. 4 is a diagram schematically illustrating a photographing system control method according to an embodiment of the present invention.
Figure 5:
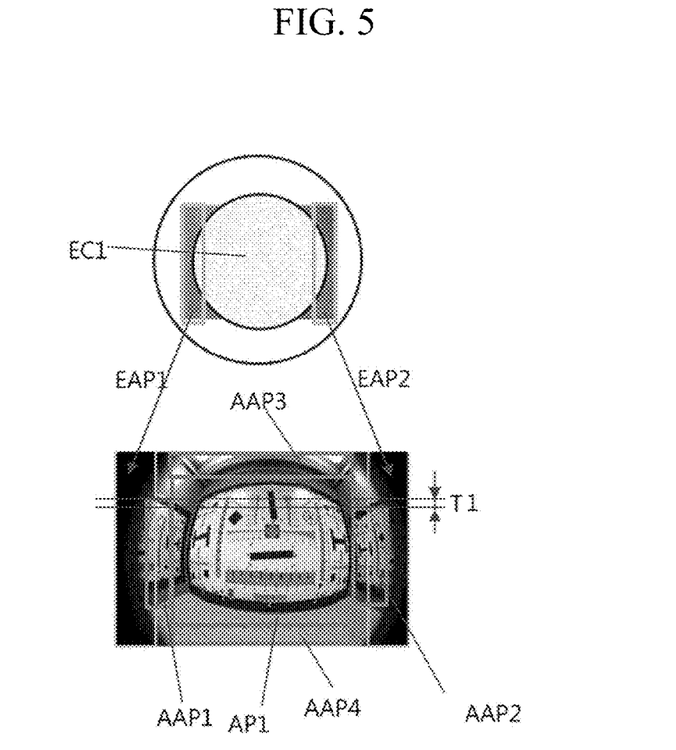
FIG. 5 is a diagram for describing the photographing system according to an embodiment of the present invention.
Figure 6:
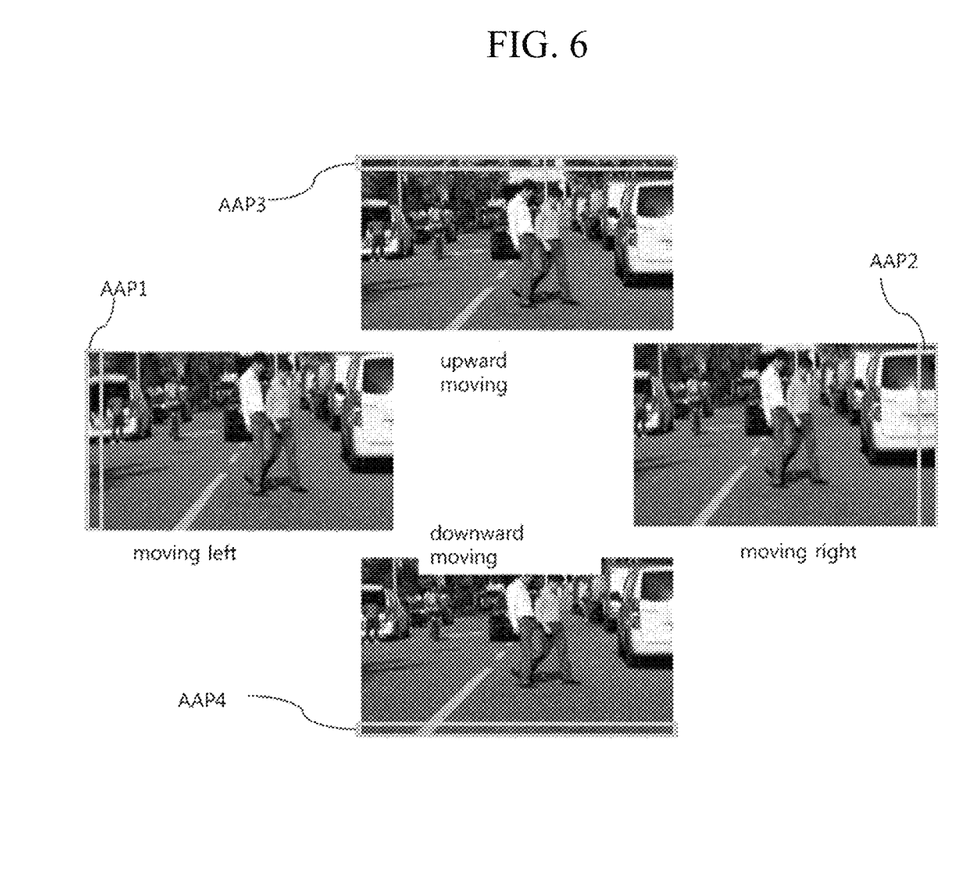
FIG. 6 is a diagram for describing the photographing system according to an embodiment of the present invention.
Figure 7:
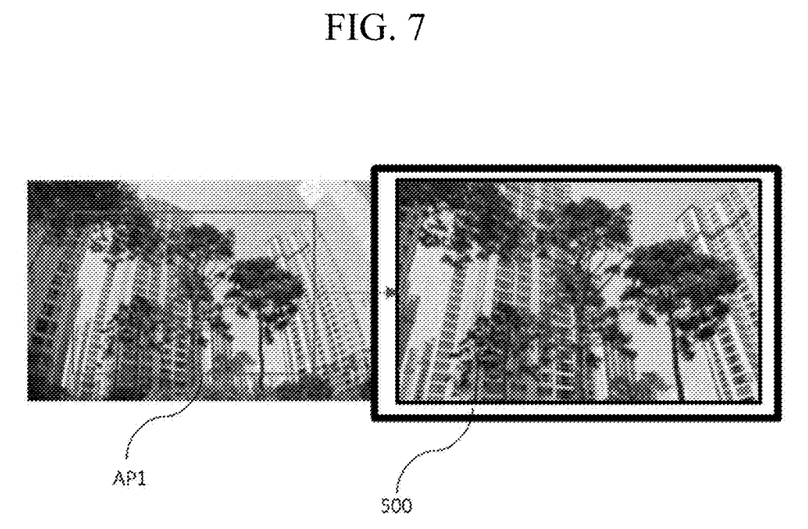
FIG. 7 is a diagram for describing the photographing system according to an embodiment of the present invention.

FIG. 1 is a block diagram schematically illustrating a photographing system 1000 according to an embodiment of the present invention, FIG. 2 is a schematic diagram for describing a region AP1 to be processed of the photographing system 1000 according to an embodiment of the present invention, FIG. 3 is a diagram schematically illustrating a user interface unit 400 of the photographing system 1000 according to an embodiment of the present invention, FIG. 4 is a diagram schematically illustrating a photographing system control method according to an embodiment of the present invention, FIGS. 5 and 7 are diagrams for describing the photographing system 1000 according to an embodiment of the present invention, and FIG. 6 is a diagram for describing the photographing system 1000 according to an embodiment of the present invention.

The photographing system 1000 according to an embodiment of the present invention may include an image sensor 110, a memory 120, and a sensor controller 130, and furthermore, further include an image signal processing unit 200, a control unit 300, a user interface unit 400, a display unit 500, a communication unit 600, a memory unit 700, etc.

In an embodiment, the photographing system 1000 may perform an image display operation by interlocking with the display unit 500 or a separate external device. In addition, the photographing system 1000 may be connected to a network, and transmit an image photographed by a camera module 100 to other devices through a network or the like.

In an embodiment, the image sensor 110 includes a pixel array 112. The pixel array 112 may have pixels arranged in rows and columns, wherein the pixel is also called a pixel as a device for generating an electrical signal in response to light. Camera-related techniques, including these pixels, the pixel array 112, etc. are introduced in a number of documents, including Patent Document 1.

In an embodiment, the memory 120 may include at least one of a volatile memory 122, and a nonvolatile memory 124. At least a part of the memory 120 may store a register value, and the memory 120 may be used as a register.

In an embodiment, the register may include at least one type of storage medium of a static random access memory (SRAM), a flash memory 120 type, a hard disk type, a multimedia card micro type, a card type memory 120 (for example, an SD or XD memory 120, or the like), a random access memory (RAM), a read-only memory (ROM), an electrically erasable programmable read-only memory (EE-PROM), a programmable read-only memory (PROM), a magnetic memory 120, a magnetic disk, and an optical disk.

The sensor controller 130 may control the image sensor 110 or serve as an interface between the image sensor 110 and other components. In an embodiment, the sensor controller 130 may perform a function of setting the register value of the image sensor 110. In addition, the sensor controller 130 may perform various functions, and may be implemented by at least one of various processors, such as a processor of an image signal processor, a system main processor, a microcontroller, etc.

In an embodiment, the register value of the image sensor 110 includes information defining a region AP1 to be processed in the pixel array 112.

The region AP1 to be processed may also be called an active pixel, a cropped area, and the like, and an image signal output from the pixel in the region AP1 to be processed may be processed and stored in the memory unit 700 or displayed on the display unit 500. On the other hand, the image signal output from the pixel located outside the region AP1 to be processed on the image sensor 110 may not be stored in the memory unit 700 or displayed on the display unit 500. However, in an embodiment, the image signal output from the pixel located outside the region AP1 to be processed may be used for distortion correction of the adjacent pixels, an interpolation process for digital zoom in or zoom out, etc.

In an embodiment, the sensor controller 130 may provide a register modification command to the image sensor 110 or the memory 120. This register modification command may include a register value that changes the position or size of the region AP1 to be processed.

In an embodiment, the sensor controller 130 may operate by a method of generating the aforementioned register modification command when receiving a predetermined of change request. At this time, the change request may be a request for moving the position of the region AP1 to be processed to the left or right or upward or downward. In addition, the change request may be a request for enlarging or reducing the size of the region AP1 to be processed.

In an embodiment, the change request may be generated in the control unit 300.

In an embodiment, the controller 300 may generate a change request by receiving a user's command, and at this time, the user interface unit 400 may be used as a means of receiving the user's command.

Here, the user interface may be implemented in the form of a remote control as illustrated in FIG. 3. In an embodiment, when a zoom in or out button is input, a change request for changing the size of the region AP1 to be processed may be generated. In an embodiment, when one or more of up, down, left, and right buttons are input, a change request for changing the position of the region AP1 to be processed may be generated.

In another embodiment, an analysis program may be executed in the control unit 300. The analysis program may analyze image data or picture data photographed by the camera module 100. In addition, the analysis program may analyze sensing data such as a proximity sensor, a luminance sensor, etc. In an embodiment, the analysis program may detect a case where an object corresponding to the display unit 500 is not displayed in a situation in which the object close to a certain distance is detected. In this case, it is possible to generate a change request that the position of the region AP1 to be processed moves in a corresponding direction, depending on which direction the direction in which the close object is detected is based on a camera field of view. For example, when the object is detected at the left based on the camera field of view, a change request for moving the position of the region AP1 to be processed in a left direction may be generated. The generated change request is applied to the center controller and the center controller may adjust the register value of the image sensor 110 so that the position of the region AP1 to be processed is moved. In this state, as the photographing process is performed, neighboring objects that were not visible on a screen may be displayed on the screen. Accordingly, even if the user is not consciously intended, it is possible to improve the safety by widening an angle of view or moving the screen according to the analysis result of the control unit 300 to allow the neighboring objects to be visually checked. Furthermore, while the region AP1 to be processed is relatively narrowed, a register value may be modified to track an interest object.

Referring to FIGS. 3, 5 and 6, due to a decrease in ambient light amount, so-called vignetting, first and second excess regions EAP1 and EAP2 are often not output to the display unit 500 or the like. In addition, in the related art, there was no example of applying a method of modifying a register value of the region AP1 to be processed in order to use first to fourth additional regions AAP1, 2, 3, and 4 as well as to use only a general region AP1 to be processed. However, according to an embodiment of the present invention, the first to fourth additional regions AAP1, 2, 3, and 4 may be used by modifying the register value of the image sensor 110, thereby improving resource utilization efficiency.

In an embodiment, the position of the region AP1 to be processed may be defined by at least one of a start value which is a planar coordinate value of one lower end P1 of the region AP1 to be processed, an end value which is a planar coordinate value of the other upper end P2 of the region AP1 to be processed, and a middle value which is a planar coordinate value of a central point P3 of the region AP1 to be processed. Further, the position of the region AP1 to be processed may be defined by one value selected from the start value which is a planar coordinate value of one lower end P1 of the region AP1 to be processed, the end value which is a planar coordinate value of the other upper end P2 of the region AP1 to be processed, and the middle value which is a planar coordinate value of a central point P3 of the region AP1 to be processed, and a height H1 and a width W1 of the region AP1 to be processed.

In an embodiment, the size of the region AP1 to be processed may be defined by two values selected from the start value which is a planar coordinate value of one lower end P1 of the region AP1 to be processed, the end value which is a planar coordinate value of the other upper end P2 of the region AP1 to be processed, and the middle value which is a planar coordinate value of a central point P3 of the region AP1 to be processed. Further, the size of the region AP1 to be processed may be defined by the height H1 and the width W1 of the region AP1 to be processed.

In an embodiment, the image signal processing unit 200 for processing the image signal may be further provided. The image signal processing unit 200 may include an interface unit 210 and an image processing unit 220, and may process a photographing image of the camera module 100 to be output to the display unit 500, to be transmitted to other devices through the communication unit 600, or to be stored in the memory unit 700.

On the other hand, the image signal processing unit 200 and the image sensor 110 may be implemented in a system on chip (SoC) manner, and in this case, the image signal processing unit 200 may perform a function of the sensor controller 130.

In an embodiment, a register modification command Ord2 may be provided to the memory 120, not the image sensor 110.

In this case, while the register value is stored in the memory 120, when the image sensor 110 is turned on or reset, the register value may be loaded on the image sensor 110.

According to one embodiment of the present invention, it is possible to adjust the range of the screen output on the display unit 500. If a full screen is output on the display unit 500 according to a display output option, the range of the screen is adjusted to provide a user with a zoom in/zoom out effect. When the number of pixels included in the region AP1 to be processed is increased, as a region to be output is increased, a subject for a wide region is output to be relatively small on the full screen of the display unit 500 to be recognized as the zoom out. On the contrary, when the number of pixels included in the region AP1 to be processed is decreased, as the region to be output is decreased, the subject is output to be relatively large on the full screen to be recognized as the zoom in. Since there is no need to modify a logic of the image signal processing unit (ISP) 200 or perform a separate operation of the image signal processing unit 200 for zoom in or out without physically driving the lens 105, it is possible to adjust the region to be output or zoom in/out the screen while reducing resource utilization.

In addition, the angle of view of the screen output on the display unit 500 may also be changed. Here, according to one embodiment of the present invention, without driving a separate motor or a complex processing process of the image signal processing unit 200, it is possible to implement a result similar to the tilting control of a vehicle side mirror.

A pixel array 112 region of the 110 is generally formed to be larger than a region to be actually output, and this reason is that the distortion inevitably occurs on the outside of the image due to the shape of the lens 105, and thus, a digital data processing algorithm that reduces this distortion has been widely used. However, in this process, the outer portion of the pixel array 112 is often not actually utilized to be recognized as resource waste, but according to the present invention, a route of utilizing the outer region will emerge.

On the other hand, even in a method of physically adjusting a direction of the camera lens 105 to be directed, the camera lens 105 may perform a function similar to the function of the present invention. However, in order to adjust the direction of the camera, more separate components such as a motor are required and the consumption of energy and resources is involved. On the other hand, according to an embodiment of the present invention, it is possible to achieve a desired purpose by a method such as a register value change, which is very simple, has extremely low energy consumption, and significantly low time or resources required for an operation, thereby improving the efficiency of resource utilization.

Modes for the Invention

Referring to FIG. 4, a photographing system control method according to an embodiment of the present invention may include the steps of: inputting a change request for changing at least one of a position and a size of a region AP1 to be processed; applying a register modification command for adjusting a register value so as to correspond to the change request to the image sensor 110 or the memory 120; changing the register value of the image sensor 110 by the register modification command; outputting an image signal from the image sensor 110 while at least one of the position and the size of the region AP1 to be processed is changed; and processing and then displaying or storing the image signal output from the image sensor 110.

At this time, the photographing system control method may further include analyzing at least one or more of photographed image data, photographed picture data, and sensing data of an approximate sensor; and generating the change request when the analysis result corresponds to a predetermined condition.

Further, the photographing system control method may further include determining an interest object from the photographed image data; and generating a change request for changing the position of the region AP1 to be processed according to a moving direction of the interest object.

In reference numerals, reference numeral 115 (not illustrated) represents a dummy pixel, Ord1 represents a register modification command 1, Ord2 represents a register modification command 2, Fdata1 represents photographing data 1, and Fdata2 represents photographing data 2 and EC1 represents an image circle.

INDUSTRIAL APPLICABILITY

According to an embodiment of the present invention, since idle pixels in the related art may be utilized by using relatively small resources and energy, the resource efficiency of the camera may be significantly improved, and therefore, a photographing system can be used in the manufacture and installation related industries of small cameras. In particular, when the photographing system is used as a rear camera of a vehicle, its advantageous effect can be maximized.

The invention claimed is:

1. A photographing system comprising:
a camera module including: an image sensor comprising a pixel array formed by arranging pixels, the image sensor being configured to generate an electrical signal in response to light; and a memory configured to store a register value of the image sensor, the register value including information for defining a region to be processed in the pixel array;
a sensor controller configured to configure the register value, wherein, when a change request for changing at least one of a position and a size of the region is received, the sensor controller is configured to provide a register modification command to the image sensor or the memory to adjust the register value so as to correspond to the change request;
a display unit configured to display an image output from the camera module;
an approximate sensor for sensing an object; and
a control unit configured to generate the change request when a result of analyzing at least one of photographed image data, photographed picture data, and sensing data of the approximate sensor corresponds to a predetermined condition,
wherein, when the object approaching within a predetermined distance is detected and the object is not displayed on the display unit, the control unit is configured to determine a direction in which the object is detected based on a field of view of the camera module to generate the change request changing a position of the region to be processed in the direction.

2. The photographing system of claim 1, wherein the control unit is further configured to generate the change request by receiving a user's input by a user interface unit.

3. The photographing system of claim 2, further comprising:
an image signal processing unit configured to process an image signal output from the image sensor, wherein the image signal processing unit receives the change request from the control unit.

4. The photographing system of claim 1, wherein the position of the region to be processed is defined by at least one of a start value which is a planar coordinate value of one lower end of the region, an end value which is a planar coordinate value of the other upper end of the region, and a middle value which is a planar coordinate value of a central point of the region.

5. The photographing system of claim 1, wherein the size of the region to be processed is defined by two values selected from a start value which is a planar coordinate value of one lower end of the region, an end value which is a planar coordinate value of the other upper end of the region, and a middle value which is a planar coordinate value of a central point of the region.

6. The photographing system of claim 1, wherein, when the register modification command is provided to the memory, the register value is loaded to the image sensor when the image sensor is turned on or reset while the register value is stored in the memory.

* * * * *